United States Patent [19]
Heath

[11] 3,741,604
[45] June 26, 1973

[54] ROAD VEHICLE HAVING A BELOW-BED STORAGE COMPARTMENT FOR A LIFT TRUCK

[76] Inventor: John R. Heath, 3407 N. 26th Street, Tacoma, Wash. 98407

[22] Filed: June 29, 1970

[21] Appl. No.: 50,829

[52] U.S. Cl. ............ 296/1 A, 180/89 R, 214/85.1, 296/28 M, 296/37 R
[51] Int. Cl. ............................................ B60p 3/06
[58] Field of Search .................. 296/1 A, 24, 28 M, 296/37 R; 214/515, 85.1; 105/340, 368 R

[56] References Cited
UNITED STATES PATENTS

| | | | |
|---|---|---|---|
| 2,486,189 | 10/1949 | McCormick | 214/85.1 |
| 3,557,712 | 1/1971 | Milenkovic | 105/340 X |
| 3,375,947 | 4/1968 | Kissilov | 214/515 X |
| 2,541,288 | 2/1951 | Rice | 296/1 A UX |
| 2,705,081 | 3/1955 | Jacobs | 296/1 A X |
| 3,044,645 | 7/1962 | Smith | 296/1 A X |

FOREIGN PATENTS OR APPLICATIONS 826,549   3/1952   Germany ............................ 180/89

Primary Examiner—Leo Friaglia
Assistant Examiner—John A. Pekar
Attorney—John O. Graybeal

[57] ABSTRACT

A laterally extending, tunnel-like compartment is located below the cargo bed of a cargo truck. A low profile fork lift truck is fittable into this compartment. The edge of the cargo bed is recessed to provide a nook for receiving the lifting mast of the lift truck. Ramps are provided so that the lift truck can be wheeled into and out from the compartment.

25 Claims, 6 Drawing Figures

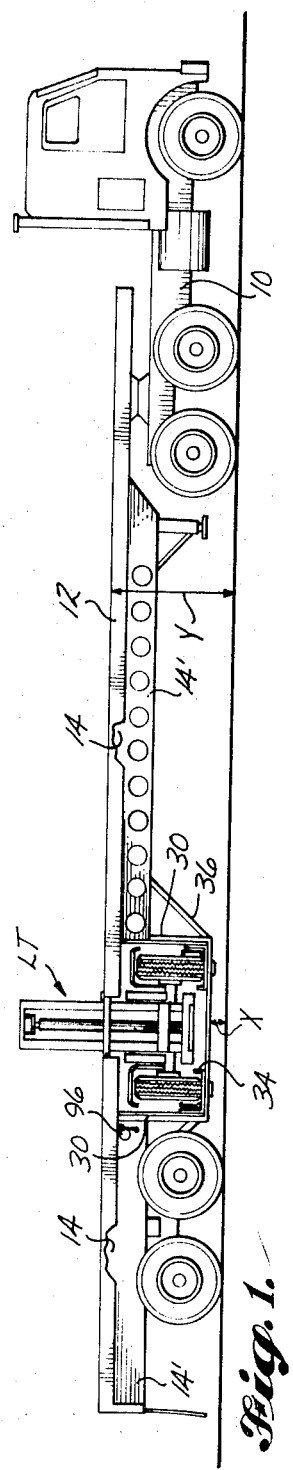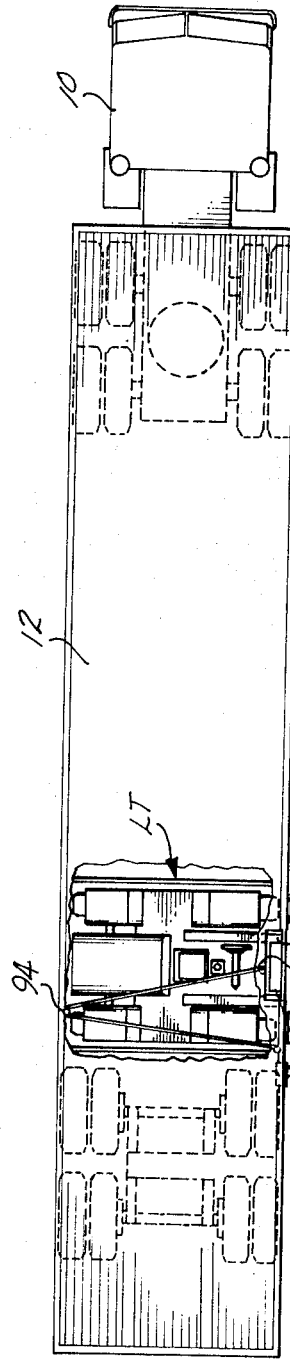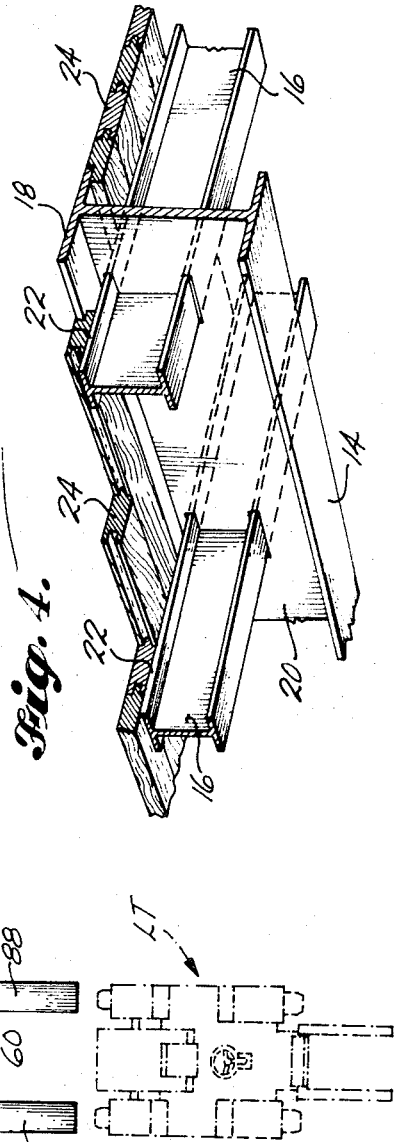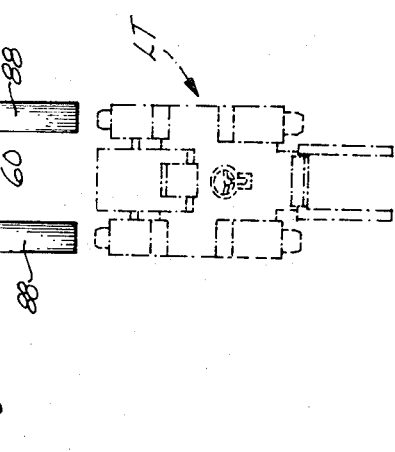

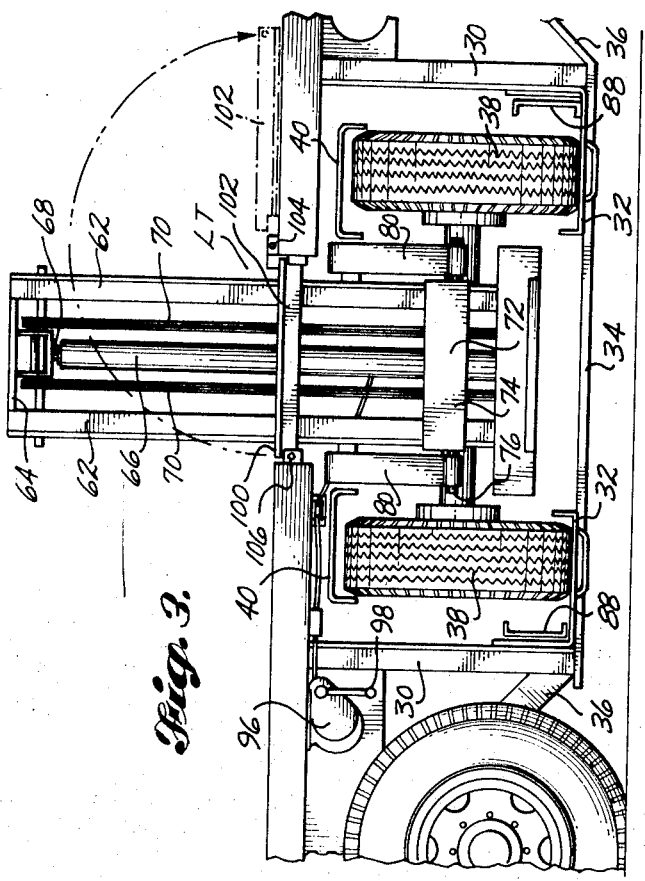
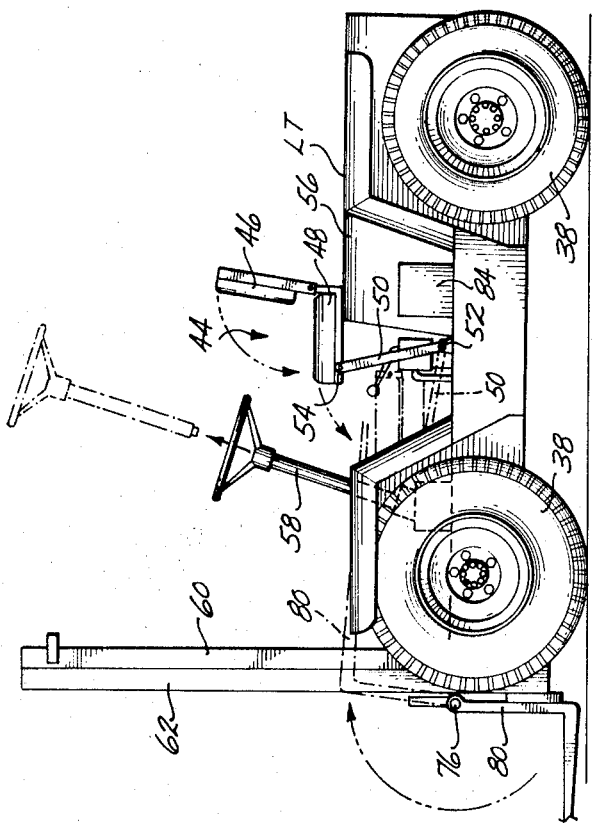
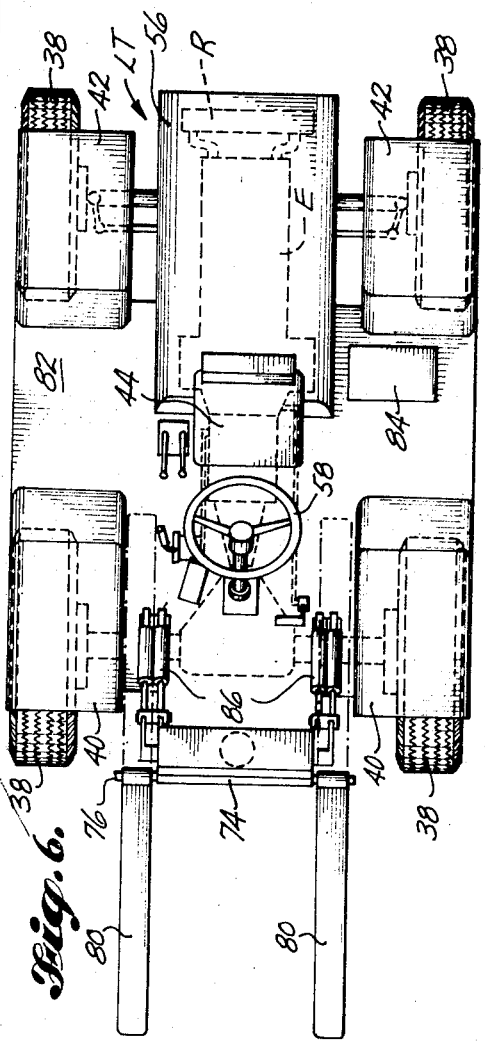

ROAD VEHICLE HAVING A BELOW-BED STORAGE COMPARTMENT FOR A LIFT TRUCK

BACKGROUND OF THE INVENTION

1. Field of the Invention

This invention relates to flat bed type cargo carrying vehicles, and more particularly to rubber tired road vehicles which include a storage compartment below a cargo bed for receiving a fork lift truck used for loading and unloading cargo from the bed of the road vehicle. It also relates to a new and unique low profile fork lift truck especially designed to be carried in such a compartment, and to the combination of the lift truck and the road vehicle.

2. Description of the Prior Art

Heavy and/or large items of cargo are normally loaded onto cargo carrying vehicles by means of power equipment provided (e.g. a fork lift truck) at the loading site. When the cargo is unloaded at an established terminal power equipment is generally also available at that site for doing the unloading. However, often times cargo is loaded onto a flat bed truck or other cargo carrying vehicle at a manufacturing plant or established terminal and is then delivered directly to the site of use where no suitable unloading mechanism is available. By way of example, concrete burial vaults are usually loaded onto a road traveling truck at the manufacturing facility and then unloaded at cemeteries. Some of the larger cemeteries may have fork lift trucks or the like available for use in unloading the vaults. However, most of the smaller cemeteries, and even some of the larger cemeteries, do not have a general need for a lift truck or other lifting device and hence do not have one on hand. Similar situations exist in the construction and agricultural fields with the handling of concrete, sand, bricks, feed, fertilizer, etc.

It is known in the art for the transporter to carry a fork lift truck with him so that it is available for use in unloading the cargo at its destination. However, the known ways of carrying fork lift trucks possess several disadvantages. Some operators merely load the fork lift truck onto a portion of the cargo carrying bed of the truck. This results in both a loading and unloading problem of the fork lift truck and a reduction in the space available for carrying cargo. Examples by systems of this type are shown by U. S. Pat. No. 3,138,269, granted June 23, 1964 to Stanley C. Wilkens, and by U. S. Pat. No. 3,302,810, granted Feb. 7, 1967 to Fred C. Heidrick.

Another known approach is to provide the truck with a lift truck carrying platform which is located behind the truck proper. A disadvantage of this type of system is that it decreases the length of the cargo bed (total length of truck is limited by law) and usually requires some sort of elaborate mechanism for loading and unloading the lift truck. An example of this type of system is shown by U. S. Pat. No. 3,407,950, granted Oct. 29, 1968 to Joseph L. Ward and John D. Dixon.

SUMMARY OF THE INVENTION

The present invention relates to the provision of a below-bed compartment for a fork lift truck incorporated into the frame of a road traveling cargo carrying vehicle or the like, and to a low profile fork lift truck for use with such a transporter. The road vehicle frame and the fork lift truck body are so constructed that the fork lift truck can be easily accommodated within the carrying compartment without necessitating substantial changes in the road vehicle geometry nor a sacrifice in lift truck stability. The lift truck has relatively large balloon tires and a wide wheel base, giving it good stability. It also has a low profile so that it can be stored in a compartment of a height that is only slightly greater than the diameter of its wheels.

When the fork lift truck is located within the carrying compartment no part of it projects out laterally beyond the normal side boundary of the truck. The bed height of the truck is within the normal range, and at the same time sufficient road clearance is provided below the carrying compartment.

In preferred form, a recess is formed in a peripheral portion of the cargo bed to receive the lifting mast of the fork lift truck. The small area of this recess is the only cargo carrying area that is lost.

The present invention also relates to frame construction features of the cargo carrying vehicle, to an advantageous method of loading and unloading the fork lift truck from its carrying compartment, and to other features which are shown by the drawing and are hereinafter described with reference to the drawing.

BRIEF DESCRIPTION OF THE DRAWING

FIG. 1 is a side elevational view of a road vehicle embodiment of the present invention, and a fork lift truck embodiment of the invention shown positioned within a carrier compartment located below the cargo carrying bed of the road vehicle;

FIG. 2 is a top plan view of the assembly of FIG. 1, showing the wheel assemblies of the road vehicle in hidden lines, showing the ramp means used for loading and unloading the fork lift truck shown in their use positions, and including a phantom line showing of the fork lift truck unloaded from the carrier compartment of the road vehicle;

FIG. 3 is an enlarged scale side elevational view of the carrier compartment portion of the road vehicle, such view including a phantom line showing of the gate bar for the lifting mast recess in an open position;

FIG. 4 is an enlarged scale, fragmentary isometric view in the region of the road vehicle frame immediately above the carrier compartment;

FIG. 5 is an enlarged scale, side elevational view of the fork lift truck shown in FIGS. 1 and 2, including broken line showings of the stowed positions of the lifting fork member and the seat of the lift truck, and showing the steering wheel assembly to be removable for stowage in the passenger compartment below the upper boundary of the lift truck chassis; and FIG. 6 is a top plan view of the fork lift truck, showing that the lift truck has a wide and stable wheel base and that the four wheels of the lift truck substantially establish the side and end boundaries of the lift truck.

DESCRIPTION OF THE PREFERRED EMBODIMENT

The road vehicle illustrated in FIGS. 1 and 2 is shown to comprise a truck 10 and a trailer 12. The truck 10 is of conventional design, but the trailer 12 includes new features which are parts of the present invention.

Trailer 12 includes a pair of parallel, laterally spaced apart, bed beams 14. These beams 14 may each be fashioned from a single deep web wide flange or I-beam, or may be of composite construction. In the vicinity of an underslung cargo compartment, hereinafter to be described in detail, the lower portion of the beams 14 are cut away or eliminated for the purpose of increasing vertical clearance within the cargo compartment.

Referring now to FIG. 4, the bed frame includes a plurality of cross beams 16, shown to be I-beams. The longitudinal bed beams 14 are shown to consist of two beam members 14', 14'', one above the other. Each upper beam member 14' includes an upper flange 18 and a web 20. Openings are cut through the web 20 substantially immediately below the upper flange 18. These openings are sized and shaped to closely match the cross beams 16 in size and shape. The upper flange 22 of each cross beam 16 is contiguous the upper flange 18 of the longitudinal bed beam 14. The bed flooring, shown by way of an example to be composed of a plurality of interlocking tongue and groove planks 24, may rest directly on the upper flanges 22 of the cross beams 16. A filler plank 26 of suitable material may be positioned over the upper flanges 18 of the longitudinal beam members 14' for the purpose of raising the bed in these regions up to the same level as in the plank regions. It should be readily appreciated that this manner of constructing the cargo carrying bed of the road vehicle helps to provide additional vertical space between the bed frame and the ground surface in which to locate the underslung cargo compartment.

In the regions both forwardly and rearwardly of the cargo compartment the longitudinal bed beams 14 are constructed to be of greater total depth than they are within the cargo compartment. This may be done by securing the additional wide flange or I-beam member 14'' to the beam member 14'. As an alternative to this composite construction, the longitudinal beams 14 may each be formed from a single deep web wide flange or I-beam, with the lower flange and a lower portion of the web beam cut away in the region of the cargo compartment.

The underslung cargo compartment, which in the preferred form of the invention is a carrier compartment for a fork lift truck LT, is of tunnel form and extends transversely of the trailer 12. On its sides it is defined by a plurality of generally upright frame members 30 which are welded or otherwise rigidly secured at their upper ends to the bed beams 14, 28. The floor of the compartment may consist of a pair of laterally spaced channel-like runways 32 and one or more plate members 34 which underlie the runways 32 and interconnect the lower ends of the frame members 30. A plurality of angle brace members 36 are interconnected between lower portions of the beam members 30, 34 and portions of the beam 14 both forwardly and rearwardly of the carrier compartment. The truss-like structure composed of the frame members 30, 34, 36 functions to carry some of the bed loading through the cargo compartment region and in that manner compensate for the loss in depth of the beams 14 in such region.

In the preferred form of the invention the underslung cargo carrying space is sized to receive the chassis and wheel portions of a relatively compact lift truck LT, best shown by FIGS. 5 and 6. This lift truck LT comprises four rubber tired wheels 38 of a relatively large size so the truck can be supported by soft and loose materials. Preferably no sacrifice is made in the spacing of the wheels 38. All of the wheels 38 are relatively widely spaced apart so that the lift truck LT will be stable even when lifting loads up to or down from a substantial height.

According to the invention the width and length dimensions of the lift truck LT are substantially established by the outer boundaries of the wheels 38. As shown by FIG. 6, the chassis of the lift truck LT has end and side boundaries which substantially coincide with the front and rear side boundaries of the wheels 38. As shown by Likewise, the wheel diameter comes very close to establishing the maximum height of the lift truck LT. As shown by FIGS. 3 and 5, the lift truck LT includes front and rear fender sets 40, 42 which are spaced only a slight distance above the larger diameter front wheels 38. These fenders 40, 42 are flat topped and establish the upper boundary of the lift truck LT.

A fold down driver's seat 44 is located generally centrally of the chassis. It comprises a back rest portion 46, a seat cushion portion 48 and a support frame 50. The back rest portion 46 is foldable down onto the cushion portion 48 and the resulting assembly is swingable forwardly into the recess provided for the driver's feet. This is made possible by a pivot joint 52 and a second pivot joint at 54. Preparatory to use the seat cushion portion 48 is secured (by means not shown) to the upper portion of a motor cover 56. When it is desired to move the seat into a stowed position the seat is disconnected from motor cover 56. The back rest portion 46 is swung forwardly onto the cushion portion 48, and the entire assembly is swung forward about pivot joint 52 to place the seat in the foot cavity at a level below the upper boundary of the lift truck LT. The steering wheel assembly 58 may be of a plug-in style, so that it can easily be removed and set into the recessed area of the chassis for stowage, as shown. Alternatively, it can be made to swing rearwardly down into a retracted position below the upper boundary of the lift truck LT.

A lifting tower or mast 60 is provided at the forward end of the lift truck LT. Mast 60 includes a telescopic frame including side post members 62 interconnected at their upper ends by a cross frame member 64. The movable upper section of the lift mast 60 is raised and lowered by a hydraulic cylinder 66, the piston 68 of which is connected to the cross frame 64. The upper section of the lift mast 60 carries a pair of chains 70 supported by upper and lower sets of chain sprockets. A lifting fork assembly 72 is secured to the chains 70 and is raised and lowered by appropriate movement of the chains 70. The lifting tine assembly 72 includes a transverse beam 74 carrying a shaft 76 on which a pair of generally L-shaped lifting tines 80 are journaled. FIG. 5 shows the lifting position of the tines 80 by solid lines and the retracted position of the tines 80 by broken or phantom lines. The tines 80 are shown to be retracted in FIG. 3.

Lift truck LT is preferably powered by an internal combustion engine E housed within a motor compartment located rearwardly of the seat below the cover 56, together with a radiator R and other portions of he power plant. The gas tank may be housed under chassis cover 82. A battery 84 may be located on the opposite side of the lift truck LT. The lifting tower assembly may include hydraulic cylinders 86 for controlling the attitude of the mast 60.

According to the invention, a pair of detachable ramps 88 are connectible to the entrance portion of the runway channels 32, to provide driveway means leading from the ground adjacent the trailer 12 up into the carrier compartment. The lift truck LT is driven by the operator into a loading position part way up the ramps 88. Then the free end portion 90 of a tow line 92 is secured to a ring or other member on the lift truck LT immediately rearwardly of the lifting mast 60. This line 92 extends rearwardly through the carrier compartment to and over a pulley or other type of guide 94 and then back to a hand operated winch 96 located to one side of the entrance of the carrier compartment. After the line 92 is secured to the lift truck LT, the operator turns the crank 98 and reels in the line 92. The line 92 in turn pulls the lift truck LT up the ramps 88 and into the carrier compartment.

A recess 100 sized to receive the lifting tower 60 is preferably provided in the side portion of the truck bed above the entrance to the storage compartment. In FIG. 3 the mast 60 is shown located within such a recess 100, and a gate bar 102 is shown in a position closing the entrance to the recess 100. Gate bar 102 may be hinged at 104 so that it can be merely lifted and swung out of the way into the position shown by broken lines in FIG. 3. A pin lock 106 or its equivalent is provided at the opposite end of bar 102, so that the bar 102 can be firmly secured in its closed position. Following their use, the ramps 88 are preferably disconnected and then slid sideways into the side regions of the carrier compartment between the wheels 38 and the frame members 30 (FIG. 3). When the lift truck LT is properly positioned within the carrier compartment no portion of it projects laterally outwardly beyond the normal side boundary of the trailer 12.

The above described bed frame construction, involving a reduced depth longitudinal beam in the region of the carrier compartment, a locating of the cross beams through web portions of the longitudinal beams, and the low profile construction of the lift truck LT, all together make it possible to locate and carry the lift truck LT in a compartment which is below the cargo bed 12 but permits the provision of the necessary ground clearance below the carrier compartment. In the illustrated embodiment the ground clearance X is at least 12 inches, and the bed height Y is within the range of standard heights for cargo beds.

It should be understood that the underslung carrier compartment can be advantageously incorporated into a vehicle and used for carrying cargo other than a lift truck LT. It is also to be understood that a number of modifications in construction and arrangement of the road vehicle and/or the lift truck can be made without departing from the spirit of the invention. The foregoing description and the drawing relate to merely one of several possible embodiments of the invention. They are offered merely for the purpose of making the invention understandable, not for the purpose of limiting the invention. The invention itself is set forth in, and is to be limited only by, the following claims.

What is claimed is:

1. A road vehicle having rubber-tired wheels, a cargo carrying bed, a structural frame for said bed extending longitudinally of the vehicle below said bed, and a lift truck carrier below said bed, said carrier comprising runway means for supporting all wheels of a lift truck of a type having a lift tower at an end thereof, provided for loading and unloading cargo onto and off from said bed, frame means supporting said runway means in a position below said cargo carrying bed and above the road, with said bed, said frame means and said runway means together defining a compartment large enough to accommodate substantially all of the wheel and chassis portions of the lift truck, said compartment being positioned to support said lift truck with its lift tower generally at a peripheral portion of the bed above said compartment, said frame means being structurally connected to and depending from said structural frame, and means for retaining the lift truck in a transport position within said compartment with its lift tower generally at said peripheral position of the bed above said compartment.

2. A road vehicle according to claim 1, further comprising front and rear wheel assemblies, wherein said lift truck carrier is located between said front and rear wheel assemblies and the compartment is open on a side of the road vehicle for loading and unloading of said lift truck.

3. A road vehicle according to claim 1, further comprising ramp means connectible to said carrier to establish a driveway for the lift truck so that it can be wheeled into and out from said compartment, said ramp means including a detachable connection between it and said carrier so that the ramp means can be removed in preparation for movement of the road vehicle.

4. A road vehicle according to claim 1, further comprising ramp means for establishing a driveway for the lift truck so that it can be wheeled into and out from said compartment, and a loading assist means on said vehicle, connectible to said lift truck and operable to apply a force on said lift truck tending to move it up the ramp and into the compartment.

5. A road vehicle according to claim 4, wherein said assist means comprises a tow line connectible to the lift truck and in use extending therefrom rearwardly through said carrier compartment, and means including a winch secured to said vehicle for exerting a pull on said tow line, so that the lift truck is in turn pulled by said line into the compartment.

6. A road vehicle having rubber-tired wheels a cargo carrying bed, and a lift truck carrier below said bed, said carrier comprising runway means for supporting all wheels of a lift truck provided for loading and unloading cargo onto and off from said bed, and frame means supporting said runway means in a position below said cargo carrying bed and above the road, said bed, said frame means and said runway means defining a compartment large enough to accomodate substantially all of the wheel and chassis portions of the lift truck, said bed being recessed above said compartment, and said recess being sized to receive and accommodate a lift tower, whereby a lift truck of a type having a vertically elongated lift tower at an end thereof can be carried in said carrier.

7. A road vehicle according to claim 6, further comprising a gate interconnectible between portions of said bed on opposite sides of said recess, to span the recess and retain the lift tower in said recess.

8. A road vehicle having rubber-tired wheels, a cargo carrying bed, and a lift truck carrier below said bed, said carrier comprising runway means for supporting all wheels of a lift truck provided for loading and unloading cargo onto and off from said bed, and frame means supporting said runway means in a position below said cargo carrying bed and above the road, said bed, said frame means and said runway means defining a compartment large enough to accomodate substantially all of the wheel and chassis portions of the lift truck, said carrier compartment extending transversely of said cargo bed, and said vehicle comprising at least one longitudinal beam underlying and supporting said cargo bed, said beam being of reduced depth in the region of said compartment in comparison to its depth both forwardly and rearwardly of said compartment, to provide clearance for an upper portion of the lift truck, and supplementary structure support means for said bed including said frame means and said runway means extending from a portion of said beam forwardly of the carrier compartment downwardly and under said compartment, and then upwardly to a portion of said beam rearwardly of said compartment.

9. A road vehicle according to claim 8, wherein said supplementary structure support means comprises angle brace members interconnected to a lower portion of the compartment defining frame means upwardly to portions of the longitudinal beams located forwardly and rearwardly of the compartment.

10. A road vehicle according to claim 8, wherein said beam includes a vertical web portion and a horizontal upper flange portion, wherein said vehicle includes a plurality of cross beams, and wherein individual openings are cut through said web substantially immediately below said flange for receiving said cross beams.

11. A road vehicle according to claim 10, wherein said cross beams each has an upper flange and a vertical web, and the opening in the web of the longitudinal beam substantially matches the cross section of the cross beams.

12. A road vehicle having a cargo carrying bed and a cargo carrying compartment below said bed, at least one beam extending longitudinally of the vehicle below said bed, said beam being of a reduced depth in he region of said compartment in comparison to its depth both forwardly and rearwardly of said compartment, so as to increase the depth of said compartment, and supplementary structural support means for said bed, including side and bottom frame means for said compartment, extending from a portion of said beam forwardly of the compartment, then downwardly and below said compartment, and then upwardly to a portion of the beam rearwardly of said compartment.

13. A road vehicle according to claim 12, wherein said supplementary structure support means comprises angle brace members interconnected to a lower portion of the compartment defining frame means upwardly to portions of the longitudinal beam located forwardly and rearwardly of the compartment.

14. A road vehicle according to claim 12, wherein said beam includes a vertical web portion and a horizontal upper flange portion, wherein said vehicle includes a plurality of cross beams, and wherein individual openings are cut through said web substantially immediately below said flange for receiving said cross beams.

15. A road vehicle according to claim 14, wherein said cross beams each has an upper flange and a vertical web, and the openings in the web of the longitudinal beam substantially matches the cross section of the cross beams.

16. In combination, a road vehicle having a cargo carrying bed and front and rear wheel assemblies, a lift truck carrying compartment below said bed between said front and rear wheel assemblies, at least one beam extending longitudinally of the vehicle below said bed, said beam being of a reduced depth in the region of said compartment in comparison to its depth both forwardly and rearwardly of said compartment, so as to increase the depth of said compartment, and supplementary structural support means for said bed, including side and bottom frame means for said compartment, extending downwardly from a portion of said beam forwardly of the compartment, then below said compartment, and then upwardly to a portion of the beam rearwardly of said compartment, said compartment being open on a side of the road vehicle to form an entrance way into said compartment at such side, and a lift truck movable into and out from said compartment through said entrance way, said compartment being large enough to accommodate substantially all of the wheel and chassis portions of the lift truck.

17. The combination of claim 16, wherein said supplementary structure support means comprises angle brace members interconnected to a lower portion of the compartment defining frame means upwardly to portions of the longitudinal beam located forwardly and rearwardly of the compartment.

18. The combination of claim 16, wherein said beam includes a vertical web portion and a horizontal upper flange portion, wherein said vehicle includes a plurality of cross beams, and wherein individual openings are cup through said web substantially immediately below said flange for receiving said cross beams.

19. The combination of claim 18, wherein said cross beams each has an upper flange and a vertical web, and the opening in the web of the longitudinal beam substantially matches the cross section of the cross beams.

20. In combination, a road vehicle having a cargo carrying bed, a structural frame for said bed extending longitudinally of the vehicle below said bed, and a lift truck carrier below said bed, and a lift truck comprising a chassis with wheels and an upstanding lifting tower, movable into and out from said carrier, said carrier comprising runway means for supporting said runway means in a position below said cargo carrying bed with road clearance below said runway means, with said bed, said frame means, and said runway means defining a compartment large enough to accommodate substantially all of the wheel and chassis portions of the lift truck, with said runway means supporting said lift truck. within said compartment with its lifting tower generally at an entrance to the compartment, extending upwardly above said bed, and supplementary structural support means for said bed, including said frame means and said runway means, extending from a portion of said structural frame on one side of the compartment downwardly and under said compartment and then upwardly to a portion of said structural frame on the opposite side of said compartment.

21. The combination of claim 20, wherein said lift truck comprises front and rear wheels, a low profile chassis, the upper and front and rear end boundaries of which are substantially at the upper and end boundaries of the wheels, means supporting the lifting tower at one end of said lift truck, and lifting fork means having a generally horizontal use position in which it projects forwardly of said tower, and a transport position, with the end boundary of said lift truck at the lifting tower end of said truck being substantially at the outer plane of the lifting tower when said lifting fork means is in its transport position.

22. The combination of claim 21, further comprising a steering wheel having a use position in which it projects upwardly above the upper boundary of the chassis, and a lower stowage position in which it is substantially at or below said upper boundary.

23. The combination of claim 22, further comprising an operator's seat having a use position in which at least a portion of it projects upwardly a substantial distance above the upper boundary of said chassis and a stowed position in which it is substantially at or below said upper boundary.

24. The combination of claim 20, said road vehicle further comprising front and rear wheel assemblies, wherein said lift truck carrier is located between said front and rear wheel assemblies and the compartment is open on a side of the road vehicle for loading and unloading of said lift truck from such side.

25. A road vehicle having rubber-tired wheels a cargo carrying bed, a structural frame for said bed extending longitudinally of the vehicle below said bed, and a carrier below said bed for receiving a lift truck having a lift tower at an end thereof, said carrier comprising runway means for supporting all wheels of the lift truck, frame means supporting said runway means in a position below said cargo carrying bed and above the road, with said bed, said frame means and said runway means defining a compartment of a size large enough to accommodate substantially all of the wheel and chassis portions of the lift truck and positioned to support said lift truck with its lift tower generally against a peripheral portion of the bed above said compartment, and supplementary structural support means for said bed, including said frame means and said runway means, extending from a portion of said structural frame on one side of the compartment downwardly and under said compartment and then upwardly to a portion of said structural frame on the opposite side of said compartment.

* * * * *